United States Patent [19]

Rando

[11] Patent Number: 4,915,757
[45] Date of Patent: Apr. 10, 1990

[54] CREATION OF THREE DIMENSIONAL OBJECTS

[75] Inventor: Joseph F. Rando, Los Altos Hills, Calif.

[73] Assignee: Spectra-Physics, Inc., San Jose, Calif.

[21] Appl. No.: 190,604

[22] Filed: May 5, 1988

[51] Int. Cl.$^4$ ............................................. G06F 15/46
[52] U.S. Cl. .......................................... 156/64; 156/59; 156/155; 156/344; 156/350; 364/474.08; 364/478.37; 428/402
[58] Field of Search ........................... 156/155, 58–59, 156/350, 64, 344; 364/474.05, 474.08, 474.37, 474.04, 474.35; 434/82, 96, 150; 428/313.3, 313.5, 317.3, 407, 402

[56] References Cited

U.S. PATENT DOCUMENTS

| | | | |
|---|---|---|---|
| 3,085,923 | 4/1963 | Agnew | 156/58 |
| 4,401,494 | 8/1983 | Pernicano et al. | 156/155 |
| 4,575,330 | 3/1986 | Hull | 156/58 X |
| 4,626,999 | 12/1986 | Bannister | 364/474.08 |
| 4,665,492 | 5/1987 | Masters | 364/474.05 X |
| 4,732,806 | 3/1988 | Wycech | 428/406 X |
| 4,752,352 | 6/1988 | Feygin | 156/517 X |

*Primary Examiner*—David Simmons
*Attorney, Agent, or Firm*—Donald C. Feix; Paul Davis; Thomas M. Freiburger

[57] ABSTRACT

Three dimensional objects or models, such as three dimensional images or shapes stored in a computer, are generated as real models by addition of material to a base, such as with photo-hardenable liquid, or by removal of material from an initially oversized mass. Optical feedback is employed to monotor the actual condition of the model being formed, at each work site. The condition of the model at the work site, e.g. the presence or absence of material, is fed back to the machine or building tool, or to a computer controlling the tool. On the basis of such monitoring and feedback, decisions are made whether or not to perform more work at any particular work site. In this way, the actual three dimensional model being constructed is made to conform substantially to stored information relative to the desired dimensions of the model. In a preferred embodiment, models are produced by ablating a mass of small spheres held together by a relatively weak wax or cement. The spheres are cemented together preferably only at their small areas of contact. The ablating may be accomplished by a laser beam whose energy is focused in succession on balls which are to be removed, heating them and breaking the wax or cement bonds. Feedback of the model condition may be optical, e.g. by laser distance measuring non-contact sensors. Alternatively, the spherical balls may be removed by blasts of hot air or gas delivered through a narrow tube. In this case monitoring and feedback may be via measuring of capacitance between the air-delivering tube and the model, representing distance, or by monitoring of the pressure in the tube, indicating distance from the model.

17 Claims, 5 Drawing Sheets

FIG. 3
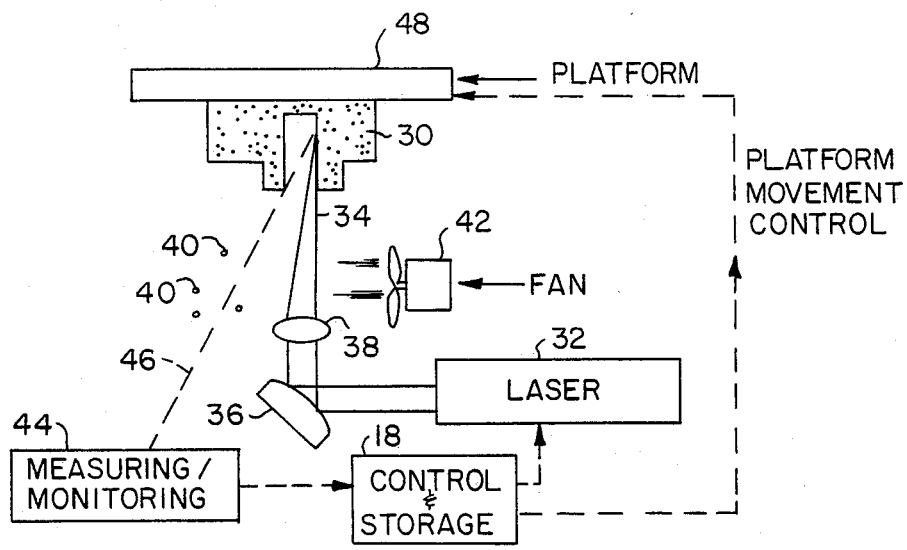
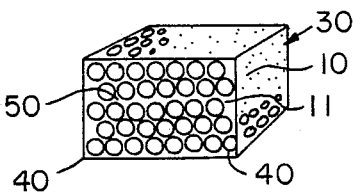
FIG. 4

CREATION OF THREE DIMENSIONAL OBJECTS

BACKGROUND OF THE INVENTION

The invention relates to three dimensional model building, and more particularly to methods and apparatus for creating three dimensional objects using active feedback.

A considerable number of methods and systems have previously been described for building three dimensional models by automated machines or processes. These can be categorized generally into two types of processes, subtractive processes and additive processes.

In subtractive model building processes, generally the process involves removal of material by some sort of tool, from an original block of material. Conventional machining of metals, plastics and other materials by machine tools has been automated for some time, and by such systems relatively complex three dimensional shapes can be generated from a computer program. In U.S. Pat. No. 4,238,840 (Swainson), three dimensional figures were described as formed in a medium having two active components by causing two radiation beams to intersect in the medium. The surface of a desired figure or shape was traced within the medium, then solvent was used to strip away excess medium material external to the generated shape or model. The Swainson system used a computer to feed information to the model creating tools, i.e. lasers, and in this sense the patent is representative of other prior methods wherein stored computer programs were used for making three dimensional models based on stored information.

U.S. Pat. No. 3,635,625 (Voss) discloses an apparatus for carving a material in sheet form to produce a desired surface pattern. The patent is primarily concerned with carving surface patterns into carpeting, and discloses the use of carving fluids such as hot inert gas, hot air, steam or burning gas.

In the additive process for three dimensional model building, material is added or created or goes through a state change. This process is represented in several prior publications by the use of photo hardenable liquid materials cured and hardened by specified radiation, such as ultraviolet light. In Hull U.S. Pat. No. 4,575,330, three dimensional objects were described as generated by creating a cross-sectional pattern of the object to be formed at a selected surface of a fluid medium which can be hardened by radiation. The process of the Hull patent, controlled by a computer, was essentially two-dimensional, in that successive adjacent cross-sectional layers of the object were successively formed in a stepwise laminar buildup of the desired model. A stage or platform was moved, i.e. lowered in a liquid volume, while a writing head traced successive layers of the desired three dimensional shape at the surface of the liquid.

Somewhat similar processes were described in an article entitled "Automatic Method for Fabricating a Three-Dimensional Plastic Model With Photo-Hardening Polymer", by Hideo Kodama, Nagoya Municipal Research Institute, Rev. Sci. Instrum. 52(11), November 1981. The article described formation of an object in layered, stepped stages from the surface of a liquid bath of the photo-hardenable material, or alternatively from the bottom of the liquid volume. Light capable of curing the polymer was played onto the surface and the desired shape of a layer was created by using an appropriate mask; or an optical fiber was manipulated by an X-Y plotter to trace each layer in succession.

U.S. Pat. No. 3,974,248 disclosed, in the context of a thermoplastic sheet material, a system for determining or controlling the profile of a property of the sheet-like article. Monitoring of the properties was accomplished by means of electrical gauging signals, positioned across the width of a sheet of material advanced from a roll. Principally, the disclosure was concerned with the determination and control of the thickness profile of sheet materials formed by processes such as rolling, calendering and extrusion. The monitoring system disclosed in the patent could be used as feedback to apply corrective measures automatically to the manufacturing processes, to return the thickness profile to the desired specifications.

However, the Atkinson patent did not deal with formation of three dimensional models such as is concerned with the present invention, and the principles disclosed relative to thickness profiles of sheet materials would be of limited use in constructing relatively complex shapes in three dimensional models.

There has been a need for an accurate yet relatively straightforward system for producing three dimensional models, at reasonably good speed and at moderate cost. Those are objects of the present invention described below.

SUMMARY OF THE INVENTION

In accordance with the present invention, three dimensional models are produced by performing operations at work location sites with a work element which can be selectively activated either to perform work or not to perform work at each one of the sites, based on model information supplied to the work element, which may be stored in a computer, and also preferably based on monitoring of the actual condition of the material at each work site as affected by the action of the work element at that site. Feedback is thereby used to control the actual model forming process, based on the results achieved thus far at each work location site.

In a preferred embodiment, the method and system of the present invention are subtractive, removing material from an initially oversized block which may be formed of a multiplicity of small spheres. The small spheres, the size of which is responsive to the degree of resolution needed in the model to be produced, are held together by wax or a relatively weak cement binder which bonds these spheres preferably only at the narrow areas of contact between adjacent spheres. When applied to the mass of spheres the cement is drawn to the contact points by surface tension.

The small spheres, which may be metal, plastic, glass or ceramic, selectively receive energy during the model forming process. The energy is in the form of heat or other energy which is transferred into heat as it focuses upon a sphere. The heat elevates the temperature of the sphere and breaks the bond between the sphere and adjacent spheres, so that the subject sphere falls away from the block or mass.

The process of the invention is not an essentially two-dimensional, laminating or layer-building process, but rather a three-dimensional process wherein a work element may approach the block of work material from any of a number of different angles of faces of the block. This movement may be achieved in effect by a combination of work element movement and material block movement via a platform.

It is important that these small spheres of the block of material be held together by glue, wax or cement only at their points of contact. This has the advantage of avoiding the accumulation of wax or cement which would change the shape of the three dimensional model by interfering with exterior dimensions and surfaces; it also reduces heat transfer between adjacent spheres by limiting the available contact area for the movement of heat, aiding in the accuracy of the process; and, once the desired overall shape of the three dimensional model has been created, it allows a permanent cement to be put into the voids among the spherical balls, to permanently bond the model together and form a completed object of higher integrity.

The heat source or work element, in one preferred embodiment of the invention, is a focused laser beam which may be directed, under the control of a computer or other controller, successively at appropriate areas of the block of material to remove all appropriate volume of material so as to leave the desired three dimensional shape. Stored information may be used, generated on a computer, or information obtained from scanning an object to be duplicated (e.g. in real time) may be used to control the work element.

In conjunction with the preferred process of the invention by which spherical balls are removed from a mass to create a desired three dimensional shape, monitoring and feedback of the actual condition of the block of material is used for increasing accuracy and precision in the forming of the desired shape.

One preferred method of monitoring and feedback is to use laser distance measuring non-contact sensors. These can be embodied in auxiliary lasers separate from the "writing" laser, and they can feed information to a computer as to whether an adequate amount of material has been removed at a given site. If it has not, then the work element may need to return to that work site to remove more of the spherical balls, or the work element may be caused to generate a higher degree of energy in a particular area or work site, until the optical sensing devices determine that the model surfaces at the correct position at that particular site or area. Alternatively, the same laser "write" beam can be used for the optical feedback, by monitoring reflected light or scattered from the work piece surface.

Instead of a laser beam or other radiant energy for generating heat at the spheres, the method of the invention may employ a fine, precise stream of hot air or other gas, through a work element which can be directed at appropriate areas of the block to remove spheres similarly to the removal by a laser beam. In this embodiment of the invention feedback of the surface position of the object being formed may be by other means than optical sensing. For example, the electrical capacity between the end of the nozzle or hot air tube and the object surface may be measured, to reflect the distance of the object surface from the nozzle and thus the status of the workpiece at a site. Another monitoring method in this context is through monitoring the pressure existing in the hot air tube or nozzle. The pressure drop in the tube can be used to indicate the distance of the tube end from the object surface.

The invention encompasses two different types of feedback for controlling the process of forming the three dimensional object: intermittent feedback, whereby the system repeatedly determines whether removal of material, or sufficient removal of material, has occured at a particular work location site; and continuous feedback, whereby the manipulation of the tool or the work element is actually controlled in real time by continuous monitoring of the position of the object surface at the work location site.

It is among the objects of the invention to produce accurate three dimensional objects or models by controlling a work element by using information regarding the desired shape of the three dimensional object, and to monitor the shape of the object being created during the model forming process, to enhance the accuracy of the generated model. Other objects are to accomplish the model building at reasonable speed and cost.

Other and further objects of the present invention will be apparent from the following description and claims and are illustrated in the accompanying drawings, which by way of illustration show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 3 is a schematic view which may be considered to be in elevation, indicating generally method and apparatus according to the invention for automated production of a three-dimensional object or model by a substractive process, and with monitoring of a model's shape and feedback to a computer controlling a tool which selectively removes material from an initially oversized block of material.

FIG. 4 is a schematic view in perspective, illustrating a preferred aspect of the method of the invention, wherein the block of material to be shapped is formed of a large multiplicity of small spherical balls adhered together at their contact points by wax or relatively weak cement.

FIG. 6 also indicates a feedback method of the invention wherein the pressure drop within a tube or needle delivering the hot air is monitored in order to determine the distance of the work surface from the end of the tool, thereby indicating actual progress in the removal of the material and the forming of the object in the specified shape.

DESCRIPTION OF PREFERRED EMBODIMENTS

Figure 1:
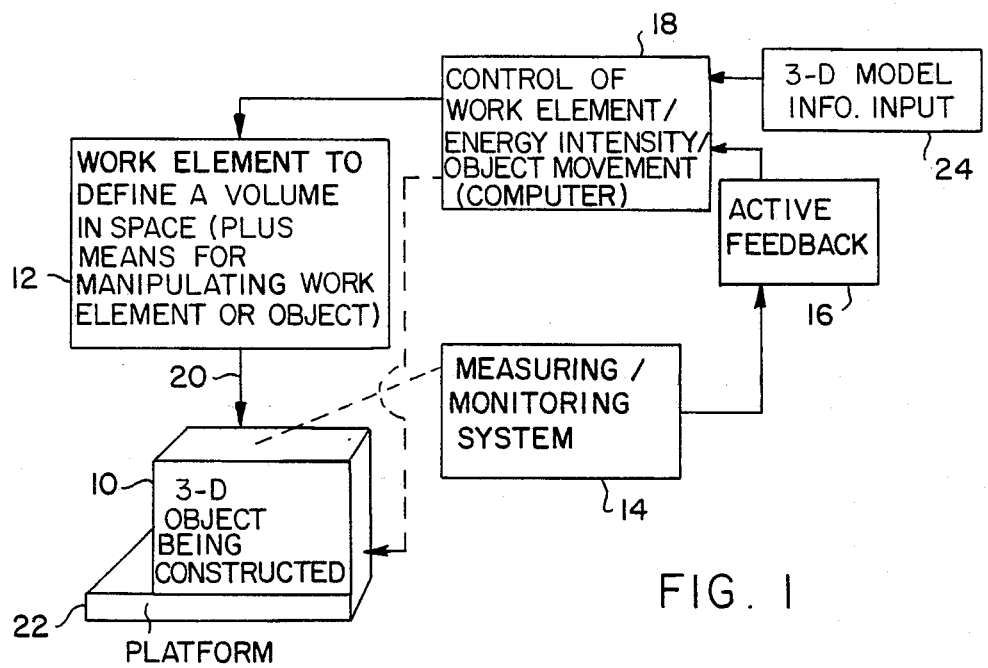
FIG. 1 is a block diagram indicating the principal steps and procedures in a method for creating three-dimensional objects in accordance with the invention.

In the drawings, FIG. 1 shows in block diagram form the principles of the invention in its broad aspect. FIG. 1 indicates a three dimensional object 10 being constructed by a work element 12. Either the object 10 or the work element 12, or both, can be minipulated to position the work element or end effector 12 in correct position relative to the object 10 in order to perform a work function at a series of work sites to generate a three dimensional model in the desired shape.

As FIG. 1 indicates, an important feature of the invention is measuring and monitoring the condition of the block of material 10 which is being formed into the three dimensional object, at a series of work sites which have been operated on by the work element 12 or which are yet to be operated on by the work element 12. Thus, the condition of the block of material 10 at each work site, i.e. the surface dimension at the work site, is measured by a measuring/monitoring system 14, and this information becomes active feedback 16 to a process control subsystem 18. The control 18 controls the work element 12, as to its position and optionally as to intensity of radiation or other energy 20 being directed at the mass of material 10. The control 18 can also regulate the movement of a platform 22 by which the block of 10 is supported.

The control subsystem 18 preferably comprises a computer or microprocessor which receives active feedback information 16 and makes decisions based on measured information from the work site, as to whether energy should be directed at a particular work site. The computer 18 then controls the work element 12 and/or the platform 22 (and optionally the intensity of energy 20) to go to the particular work site with the energy 20 (if the work element is not already in this position) and to direct energy at the work site, if a determination has been made that work is needed at that site. If not, the control 18 performs work at another work site where the work is needed.

The control or computer 18 preferably also has the function of receiving and storing information relative to a particular three dimensional shape which is desired to be generated from the mass of material 10, as represented in FIG. 1 by a block 24. It is preferred in accordance with the invention that the three dimensional model information regarding the object to be created is pre-stored in a computer such as the control device 18, for fully automated three dimensional model production. However, the invention also encompasses more manual methods for producing three dimensional models, but still involving machine measuring and monitoring, as indicated by the block 14, and active feedback 16 for making decisions relative to whether to fire or not fire energy at particular work sites.

In its broadest aspect, the present invention encompasses both substractive methods of performing three dimensional objects, and additive methods. As represented in FIG. 1, the system and method of the invention can accomplish either type of model building. In the case of additive building techniques, generally a liquid or fluid photo-curable substance is cured by energy 20 into hardened portions, which are assembled together or stacked automatically in the model building process, to form the completed three dimensional object. Feedback is used to achieve accuracy and efficiency.

In substractive methods, the energy 20 may be heat energy such as a laser beam which ablates specific areas of the mass of material 10 to remove them from the block, thus substracting all excess material from the block 10 to leave ultimately the three dimensional shape desired.

In accordance with the invention, the feedback to the control 18 for control of the work element can be either of two types: it can be an intermittent form of feedback, whereby each work site is periodically checked in advance of the progress of the work element 12 to that location, as part of a scan pattern of the work element 12 over all areas and facets of the block 10 which will need to be operated upon. In this case, the feedback for a particular work site is used to determine in advance of the work element's arrival at a particular work site, whether or not energy 20 should be directed at that particular work site. The other type of feedback is continuous feedback, wherein information relating to the surface location at a series of work sites is continually fed to the control 18, and the actual minipulation of the work element 12 and optionally the level of energy 20 directed from the work element 12 is decided upon and executed using this continuous feedback. In fact, the work element continues to direct energy at a particular work site until the measuring/monitoring system 14 determines that the desired surface level has been achieved at that site, or until a preselected intermediate level in the process has been achieved (as determined by the computer) at that site, at which point the control 18 shuts off the energy 20 directed at that work site.

Figure 2:
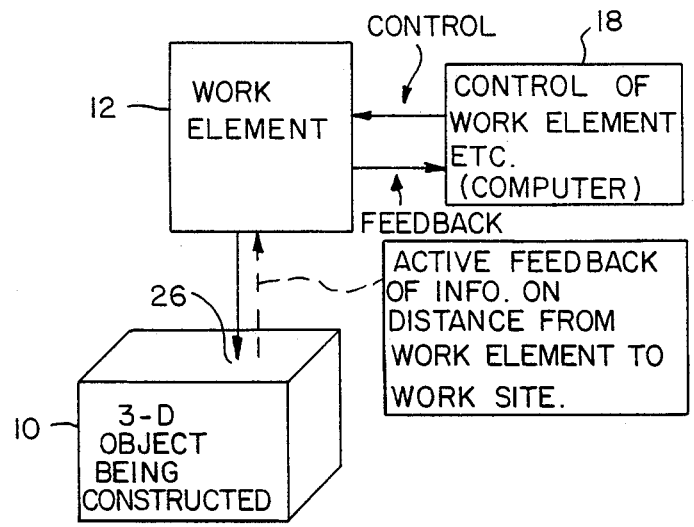
FIG. 2 is another block diagram, similar to FIG. 1 but with some modifications in the procedure.

The block diagram of FIG. 2 illustrates that the monitoring of surface position of the block of material 10 forming the three dimensional object may be accomplished simply by monitoring the distance from the end of the work element 12 to the work site 26 on the block of material 10. This distance will indicate the degree to which the surface of the block 10 at the work site 26 has been ablated (or built up, in the case of the additive process). As indicated in FIG. 2, the distance information is fed back through the work element to the control system 18, which then controls the movements (and intensity) of the work element 12 in accordance with and in response to the fed back information. The measuring of the distance between the work element 12 and the work site 26 can take several forms. For example, if the work element is an end effector delivering a laser beam, reflected light can be directed back to the work element coaxially, along the same path as the working beam delivered at the work site, and this returned light can be collected and the distance determined. This can be done by imaging the spot and using the size of the spot as an indication. Other forms of distance measurement are discussed below, particularly with reference to FIGS. 6 and 7. A further type of distance sensor can be an ultrasonic transducer on the end of the work element, which measures the magnitude and time dependence of the reflected acoustic signal.

A sonic signal from the work element can be monitored in the block to determine the thickness of the remaining material in the block. A further variation is the use of a sonic transducer in the atmosphere of the part or block, which can be used to measure the distance to the freshly-worked surface.

FIG. 3 shows schematically one exemplary arrangement in accordance with the invention by which a substractive process of three dimensional model building can be carried out.

In the model building system depicted in FIG. 3, a block or mass 30 of material is formed of relatively small particles which are held together by a wax or relatively weak glue or cement. Such particles preferably are small solid spherical balls, approximately the size of shot. An original mass of material 30 is larger than the ultimate three dimensional object to be created.

In this embodiment, a laser 32 is shown generating a focused beam 34 which is directed at the block 30 of material. The focused beam 34 may be directed at the mass of material 30 via a mirror 36 (shown as a convex mirror) and a focusing lens 38.

The laser 32 may be a low power $CO_2$ laser. Its power is sufficient to easily and sufficiently heat individual microspheres or spherical balls of the mass 30 to the extent that the weak cement or wax holding each subject sphere to adjacent spheres is heated to break the bond between spheres at their contact points. The heat from the laser beam 34 melts the binder cement or wax, and the microspheres 40 fall out of the mass of material 30.

In the embodiment shown in FIG. 3, the model 30 is being built upside down, so that the laser beam 34 approaches from below, and the spherical balls or microspheres 40 will fall away from the model being formed. A fan 42 may be used to keep the falling microspheres 40 from striking the lens 38, and to move them out of the path of the laser beam 34 as quickly as possible.

The microspheres 40 of the block of material 30 can be solid metal balls, such as common shot. Alternatively, they can be a lighter weight metal ball such as of aluminum, or they can be plastic, glass or ceramic.

The glue or wax binder is selected to have very high absorption at 10.6 mirons wavelength laser light. This assumes a shallow depth of penetration.

The mass of a metal ball serving as a microsphere 40 is high, and provides the force (through gravity) necessary to overcome surface tension and to cause the balls to fall away from the part or model 30 being formed. Ideally, one layer at a time of microspheres can be removed from the mass 30.

In accordance with the principles of the invention, as explained above, it is important that active feedback be employed during the construction of the model. In the system shown in FIG. 3, a sensor device 44 sends a probe 46 at the work site. The probe 46 may be a beam of light, with the unit 44 containing a camera which looks for the point at which the beam of light strikes the object 30, determining distance by a form of triangulation. In this way the sensor device 44 determines the amount of material removed or remaining at the work site. The beam of light 46 can measure the distance to the surface of the object just ahead of the writing beam 34 to determine whether material at a particular site is to be removed or not. This is done by comparing the signal received with that expected from the part dimensions stored in the computer.

FIG. 3 illustrates that the measuring/monitoring sensor unit 44 passes information into a control unit 18 (e.g. a computer) which acts on the information given in controlling the laser 32, manipulating the direction, focus and intensity of the writing beam 34. As also indicated in FIG. 3, the control 18 can control movement of a platform 48 which holds the block of material 30 in the inverted position for creating the three dimensional model. This is necessary for more complex shapes, including shapes with undercuts which cannot be formed all from one facet of the block of material 30.

The mass of material 30 is a specially designed material for the process and system of the invention. As indicated in FIG. 4, the block of material 40 preferably comprises tightly packed spheres 40 of a selected material, as discussed above, bonded by a temperature sensitive glue or wax binder. The spheres are in a three-dimensional mass, having multiple-sphere thickness in all dimensions. It is preferable that the glue or wax binder be present substantially only at the relatively small areas of contact between adjacent spheres, leaving relatively large interstices or voids 50 among the spherical balls 40. This helps assure that the completed shape will not have outwardly protruding pieces of glue which would adversely affect the accuracy of the model. It also reduces heat transfer from sphere to sphere through the glue or wax, so that the heat energy for removing the balls can be better localized and therefore more accurate in creating the desired shape. Further, once the three dimensional shape has been completely formed, another binder, a permanent glue, can be introduced to fill the interstices or voids 50 and therefore increase the strength of the finished three dimensional object. Such permanent glue can be introduced by soaking the model in a bath of the glue, for example.

The limit to resolution of the finished model is the size of the building blocks used, i.e. the spherical balls or microspheres 40. The spheres 40 can be made virtually as small as desired, for creating higher resolution particularly in smaller objects. Spheres need not be used, but are preferable for reasons discussed above. Grains of sand could be used as the initial mass of material, held together by a temperature sensitive, heat-releasable binder.

The release of a microsphere 40, without adversely influencing adjacent spheres, is facilited by poor thermal conductivity of the binder glue. It can be advantageous to use metal spheres having good thermal conductivity, since the spheres will then have a far greater conductivity than the binder, allowing heat to better localize to individual spheres than in the case of low thermal conductivity materials such as glass or some plastics. The laser beam (or other energy-delivering nozzle or end effector) will heat the exposed surface of a sphere or a group of spheres, and the high thermal conductivity of the metal will assure that all bonds of a sphere with neighboring spheres will release at about the same time. Very little heat is conducted into the neighboring spheres, because (1) a sphere makes only a point of contact, theroretically, with an adjacent sphere, and (2) the binder is of very low thermal conductivity.

It should be understood that although FIG. 3 shows a fan 42, in conjunction with gravity for removing the spheres 40 from the mass of material 30, other methods can be used. The model could be formed in an upright position, with dislodged spheres removed by an airjet, by vacuum suction, by a magnet or by a mechanical acceleration. The system for removal of the dislodged spheres will depend to some extent on the density of the material of the spheres—lower density spheres may be better removed by airjet or suction while higher density spheres may be better removed by gravity or mechanical acceleration, for example.

Figure 5:
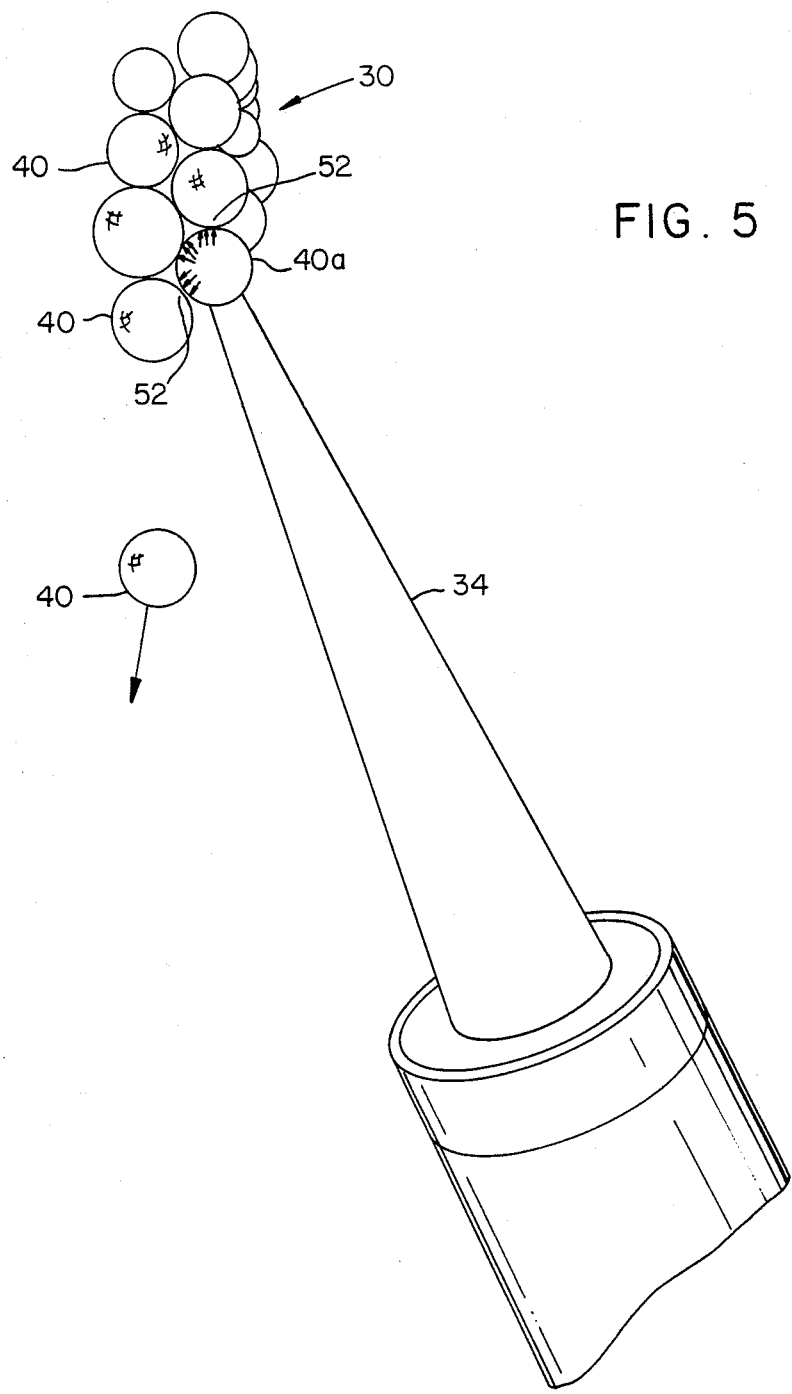
FIG. 5 is an enlarged schematic view showing a portion of the mass or block of spherical balls, and generally the manner in which balls are removed from the mass selectively by the use of heat energy applied to the specific areas.

FIG. 5 is an enlarged view, somewhat schematic, illustrating the manner of removal of the spheres 40 just described. A stream of energy 34, such as a laser beam as discussed above is focused finely enough to achieve the desired resolution of the three dimensional object, with the focus correlated to the size of the spheres 40, which will also provide a limit to achievable resolution. As indicated in FIG. 5, heat focused on a microsphere 40a is quickly absorbed into the microsphere and evenly distributed, flowing into all binder joints 52 (arrows) with adjacent microspheres 40. The binder cement is quickly released, virtually simultaneously at all involved binder joints, and the microsphere falls from the mass 30 of material.

In an alternative embodiment, which can be envisioned from FIG. 3, but which is not specifically shown, the laser ablation of the material is facilitated by using a mass of material 30 formed of microcapsules each containing a liquid. The microcapsules are cemented together at their points of contact using a glue-like solvent bond or a brittle wax. The liquid in the microcapsules is heated and vaporized by the laser beam (or other focused energy delivering device). The capsules explode, breaking the material loose from the base or block of material. Excess material can be blown away or allowed to fall by gravity, if the block is held upside down. The removal of the liquid can be enhanced by operation in a partial vacuum.

Figure 6:
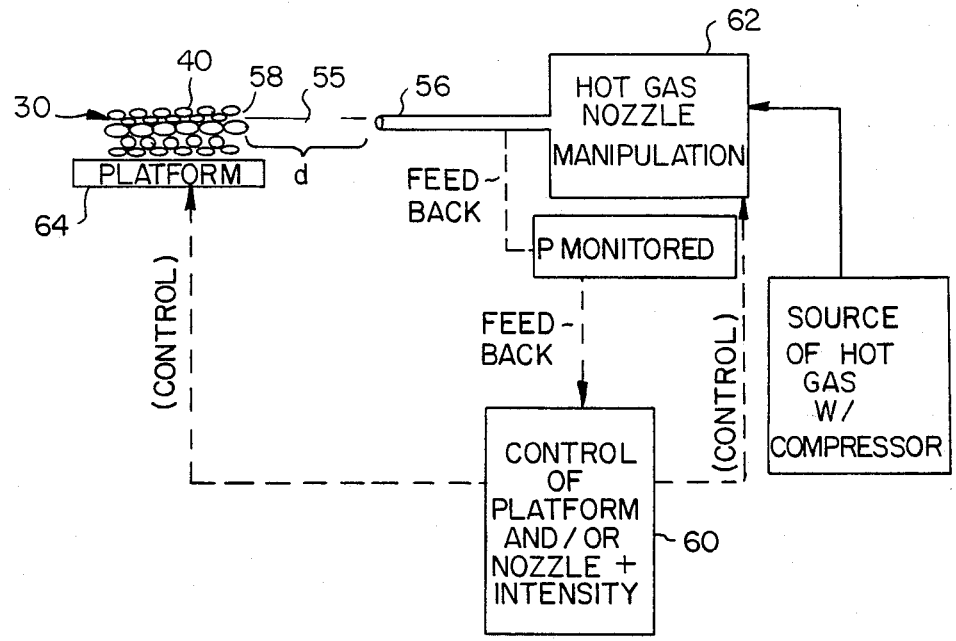
FIG. 6 is another schematic view showing an embodiment of the invention wherein hot air or other gas is used as the means for delivering heat energy to specific areas of the mass of spherical balls, i.e. to specific balls which are to be removed.
Figure 7:
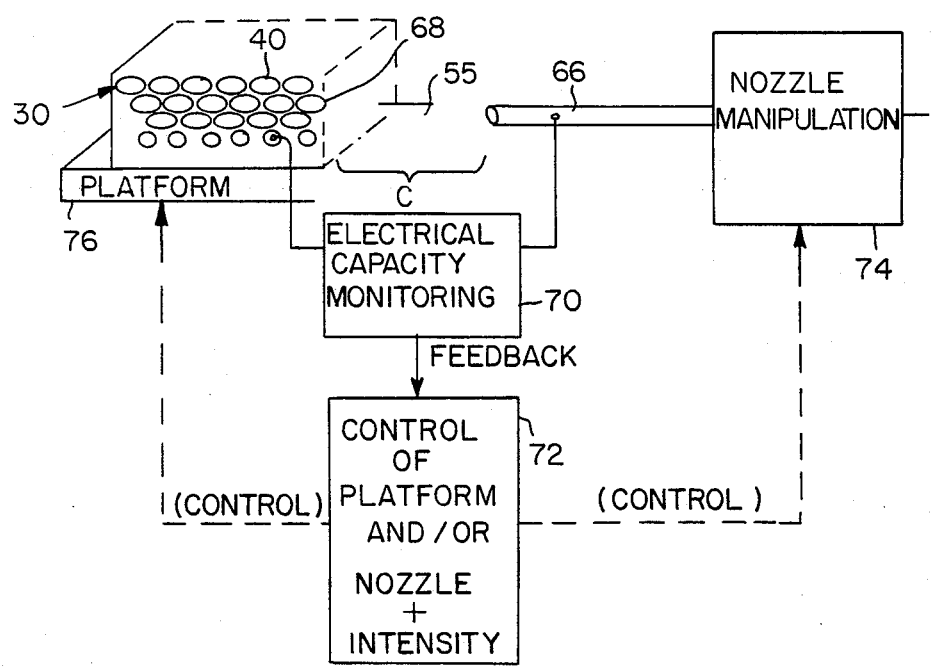
FIG. 7 is another schematic view illustrating another embodiment of the present invention, wherein electrical capacitance between the end of the carving tool and the work site of the forming object is used to determine the distance to the particular work site, thereby indicating progress in the removal of material to produce the desired specified shape.

FIGS. 6 and 7 show variations of the system of FIG. 3, wherein another form of energy is delivered to the balls or microspheres 40 in the mass of material 30. The energy may be in the form of a focused or narrowly defined stream 55 of hot air or other gas, delivered through a nozzle or thin tube 56 as illustrated in FIGS. 6 and 7.

Feedback of the condition of the work site 58 at the block of material 30 may be by measurement and monitoring of the distance d between the end of a nozzle 56 and the work site 58. In this embodiment, the distance d may be monitored by measuring and monitoring the pressure existing inside the hot air nozzle 56. The nozzle 56 will be relatively close to the mass of material 30, to the extent that an increase in the distance d will decrease pressure existing inside the nozzle. The pressure in the nozzle is precisely measured and it is continually fed back, as indicated, to a control unit 60, which may be a computer as above. The distance information derived from the pressure existing in the tube 56 is used to make decisions as to whether more material has yet to be moved from the work site 58 in order to achieve the desired surface dimension at that point. Thus, FIG. 6 shows control exercised by the control unit 60 over a hot gas nozzle manipulation device 62, which may be capable of manipulating the nozzle 56 angularly, as well as in x, y and z directions.

For complex shapes or shapes including undercuts, the system of FIG. 6 may include a platform 64 which is also moveable in rotational and translational directions under the control of the control unit 60, and this is indicated in FIG. 6.

FIG. 7 shows a system similar to FIG. 6, again with hot gas 55 used as the ablating agent, although the system of FIG. 7 could also involve other types of heat delivered to the microspheres 40, such as laser radiation or other focused radiation such as microwave, etc. which will cause the individual spheres 40 to become heated.

FIG. 7 illustrates that the distance between the end of an energy delivery nozzle or end effector 66 and the work site 68 may be monitored by measuring and monitoring the electrical capacity between the end of the end effector 66 and the work site 68. As material, i.e. microspheres 40, is ablated away, the distance from the remaining surface to the end of the end effector 66 will increase, changing the capacitance C which is indicated as being monitored by the block 70. Feedback then flows from the electrical capacity monitoring 70 to a control unit 72 or computer which can control either the nozzle manipulation 74 or a platform 76 retaining the mass of material 30, or both. As in the earlier described embodiments, the control unit 72 can control energy intensity as well as aim and position of the ablating tool 66.

While I have illustrated and described the preferred embodiments of my invention, it is to be understood that these are capable of variation and modification, and I therefore do not wish to be limited to the precise details set forth, but desire to avail ourselves of such changes and alterations as fall within the purview of the following claims.

I claim:

1. A method of constructing a three dimensional solid model, said method comprising,
    (a) scanning a first area having a plurality of predetermined, known work location sites with a work element which can be selectively activated either to perform work or not to perform work at each one of the work location sites,
    (b) supplying model information to the work element during said scanning of said first area,
    (c) activating the work element to perform work at each of the work location sites only when the model information signals that work is to be done at that site,
    (d) examining the actual condition of material at each site as affected by the action of the work element on the site,
    (e) feeding back information on said actual condition of material at each site,
    (f) comparing the feedback information on the actual condition of material at each site with the desired condition of material at that site as called for by the model information supplied pursuant to paragraph (b),
    (g) making an appropriate correction for increasing or decreasing the amount of work done by the work element when the difference between the actual condition and the desired condition of the material at the work sites is greater than a selected difference,
    (h) moving the work element to a second area having a plurality of predetermined and known work location sites,
    (i) repeating steps (a) through (g) for the second area, and
    (j) repeating step (i) for additional areas until the solid model has been physically constructed by the action of the work element.

2. The method according to claim 1, wherein the model creation process is a subtractive process, and wherein monitoring of the actual condition of each work site and feedback of that condition are accomplished by monitoring the distance between the work element and the work site at which it is generally operating.

3. The method according to claim 2, wherein the monitoring of the distance between the work element and the work site comprises measuring and monitoring electrical compacity between the end of the work element and the work site, thereby indicating distance between the end of the work element and the work site.

4. The method according to claim 3, wherein the work element comprises an end effector directing a laser beam at the block of material.

5. The method according to claim 2, wherein the work element comprises a narrow tube or nozzle delivering a stream of hot gas effective to remove material locally from the block or mass of material.

6. The method according to claim 5, wherein the distance between the work element and the work site is monitored by measuring and monitoring the pressure in the work element tube, reflecting the distance from the end of the tube to the work site.

7. The method according to claim 6, wherein the mass or block of material comprises a mass of small generally spherical balls adhered together at their points of contact by a weak cementing means which will release the bond between the balls at an elevated temperature.

8. The method according to claim 5, wherein the monitoring of distance between the work element and the work site is accomplished by measuring and monitoring electrical capacitance between the end of the work element tube and the work site on the block of material.

9. The method according to claim 1, wherein the step of monitoring the condition of the object at the various work sites comprises measuring and monitoring the shape of the forming object at particular work sites using non-contact laser distance measuring means separate from the work element, with the monitored information relating to the work site fed back to a controller for the work element.

10. The method according to claim 1, wherein the monitoring of the actual condition of the model being formed comprises measuring and monitoring the distance of the work element or tool from the work site at which the work element is generally operating, thereby indicating actual progress in the building of the model at the particular work site.

11. A method for automated production of a three dimensional model, comprising,
providing a block or mass of ablatable material which has dimensions larger than those of the three dimensional shape to be created,
moving an end effector tool around the surface of the mass or block of material to remove portions of the block of material as required by the shape to be produced, the end effector tool being effective to direct a stream of energy at specific work sites on the block of material at which the end effector tool is aimed,
monitoring the dimensions of material at work sites to determine the condition of the work site, i.e. the amount of material which remains at the work site,
feeding back information from such monitoring of the dimensions at the work sites to a controller for the end effector tool, and making decisions in the controller as to whether further energy is to be directed at particular work sites based on the information fed back to the controller, and effecting such decisions by either directing further energy to a work site using the end effector tool or not directing further energy to the work site,
and repeating the steps of directing energy at work sites to remove material, monitoring the condition or dimension of the mass of material at work sites, and feeding back such monitored information and controlling the tool based on such fedback information, while minipulating the end effector tool to all facets of the block of material at which it is necessary to remove material, until the finished three dimensional model in the desired shape has been produced.

12. The method according to claim 11, wherein the step of monitoring the condition of the work piece or mass of material at various work sites is accomplished by measuring the distance between the end effector and the work site on the block of material.

13. The method according to claim 11, wherein the block or mass of ablatable material comprises a mass of small generally spherical balls retained together at their points of contact by a relatively weak adhesive material forming bonds between adjacent spherical balls, the adhesive material being responsive to the energy from the end effector to release the bond between adjacent spherical balls when a spherical ball absorbs sufficient energy.

14. The method according to claim 13, wherein the energy comprises heat energy.

15. The method according to claim 13, wherein the relatively weak adhesive bonding the spherical balls is present substantially only at points of contact between adjacent balls, with interstices among the balls being substantially empty of the adhesive material, and the method further including adding a permanent bonding cement into the interstices among the spherical balls after completion of the desired shape to form permanent bonds among the balls to retain the completed three dimensional model in its final shape.

16. The method according to claim 11, wherein the step of monitoring the dimensions of the work piece or block of material comprises using laser distance measuring non-contact devices to determine the location of the surface of the forming model at various work site.

17. Apparatus for automated production of a three-dimensional model, comprising,
a block or mass of ablatable material which has dimensions larger than those of the three-dimensional shape to be created,
an end effector tool having means effective to direct a stream of energy at specific work sites on the block of material at which the end effector tool is aimed, and means for moving the end effector tool around the surface of the mass or block of material as required by the shape to be produced,
means for monitoring the dimensions of material at work sites to determine the condition of the work site, i.e. the amount of material which remains at the work site,
feedback means for feeding back information from the monitoring of dimensions at the work sites, and
controller means for controlling the end effector tool, for receiving fed back information from the feedback means, and for making decisions as to whether further energy is to be directed at particular work sites based on the information fed back to the controller, and for effecting such decisions by either directing further energy to a work site using the end effector tool or not directing further energy to the work site.

* * * * *